United States Patent [19]

Sato et al.

[11] Patent Number: 4,729,637
[45] Date of Patent: Mar. 8, 1988

[54] LIQUID CRYSTAL DISPLAY DEVICE HAVING COLORED LAYER CONTAINING POLYAZO COMPOUND

[75] Inventors: Yasufumi Sato, Atsugi; Yoshiyuki Nakura, Komae, both of Japan

[73] Assignee: Canon Kabushiki Kaisha, Tokyo, Japan

[21] Appl. No.: 936,632

[22] Filed: Dec. 1, 1986

[30] Foreign Application Priority Data

Dec. 2, 1985 [JP] Japan .................................. 60-272292

[51] Int. Cl.⁴ .............................................. G02F 1/13
[52] U.S. Cl. ............................. 350/339 F; 350/350 S
[58] Field of Search .............. 350/339 F, 339 R, 350 S

[56] References Cited

U.S. PATENT DOCUMENTS

| | | | |
|---|---|---|---|
| 4,560,241 | 12/1985 | Stolov et al. | 350/339 F X |
| 4,597,637 | 7/1986 | Ohta | 350/339 R X |
| 4,601,546 | 7/1986 | Ohta | 350/339 R X |
| 4,653,862 | 3/1987 | Morozumi | 350/339 R X |

*Primary Examiner*—Stanley D. Miller
*Assistant Examiner*—Richard F. Gallivan
*Attorney, Agent, or Firm*—Fitzpatrick, Cella, Harper & Scinto

[57] ABSTRACT

A liquid crystal display device having a pair of opposing substrates, conductive films provided on the substrates, and a liquid crystal filled between the opposing substrates. The device has a colored layer containing a polyazo compound and provided on at least one of the substrates.

20 Claims, 2 Drawing Figures

LIQUID CRYSTAL DISPLAY DEVICE HAVING COLORED LAYER CONTAINING POLYAZO COMPOUND

BACKGROUND OF THE INVENTION

1. Field of the Invention

The present invention relates to an electro-optical modulation device which makes use of the optical double refraction characteristics of nematic liquid crystals or ferroelectric liquid crystals.

2. Related Background Art

In general, a liquid crystal display device has a pair of substrates which are placed in parallel with each other and a liquid crystal filled in the space between these substrates. The optical characteristics of these liquid crystal are selectively changed in response to, for example, the electric field applied thereto, thus performing display of information.

Figure 1:
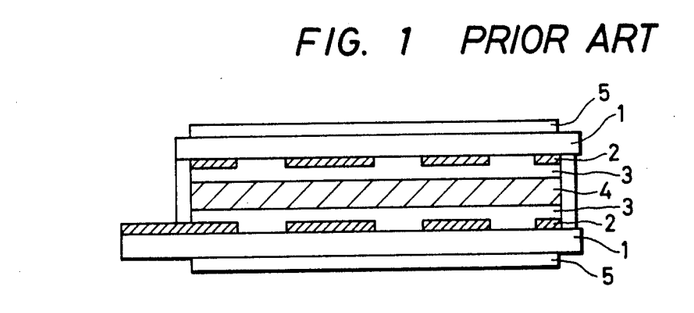
FIG. 1 is a schematic sectional view of a conventional liquid crystal display device.

FIG. 1 shows, in schematic cross-section, a twisted liquid crystal display device. In this Figure, the reference numeral 1 denotes a pair of transparent insulating substrates (electrode substrates) made of a transparent material such as glass or a plastic. Transparent electrode films 2, mainly composed of tin oxide or indium oxide, are formed on the electrode substrates 1. The electrode films 2 are formed in any desired pattern. A reference numeral 3 designates orientation control films which are formed on respective electrode pattern surfaces so as to promote the orientation of the liquid crystal. The orientation control film 3 is formed by preparing a polymeric film having high insulating power and effecting an orientation treatment on the film. The reference numeral 4 designates a liquid crystal filled in the device. Polarizers 5, which are adhered to the outer surfaces of the electrode substrates 1, are arranged in the same direction as the direction of orientation treatment of the orientation control films 3. In the liquid crystal display devices shown in FIG. 1, the substrates are arranged such that the directions of orientation of the orientation control films 3 orthogonally intersect each other when viewed in plan.

When no voltage is applied between the electrode plates, the molecules of the liquid crystal filled in the liquid crystal display device are twisted by 90°, thus exhibiting optical rotatory power. However, as electric voltage is applied to the liquid crystal display device, the molecules of the liquid crystal are rearranged substantially through 90°, so that the optical rotatory power is extinguished. Since the orientation films provided on the upper and lower substrates are arranged such that the directions of orientation thereof is orthogonal mutually. Therefore, any incident light is interrupted when the voltage is applied, so that an image with contrast between bright and dark is formed on the display surface.

The liquid crystal display device of the type mentioned above, however, suffers from a disadvantage that, since the display is not visible unless the voltage is applied, the content and the pattern of the display cannot be recognized by the user when the voltage is not applied to the device.

In order to obviate these problems, several methods have been proposed such as provision of color filters on the outer surfaces of the substrates of the liquid crystal cell, as well as color printing of the image of the pattern to be displayed. These proposals, however, are still unsatisfactory. For instance, the method employing the filter encounters a problem in that, due to a certain thickness of the substrate, the filter boundary is not readily recognized when the display device is observed obliquely.

It has been proposed also to form a colored transmitting film on the transparent electrode film which in turn is formed on the substrate. This method also suffers from disadvantages such as unevenness in the color, fluctuation in the density, change in color due to heat, and fading of color due to exposure to light.

SUMMARY OF THE INVENTION

Accordingly, an object of the present invention is to provide a liquid crystal display device which enables the user to recognize the content of the display without requiring application of voltage, and which prevents the boundaries of the filter from being observed when viewing the device obliquely, while eliminating disadvantages such as change in color due to heat, fading of color due to exposure to light, and fluctuation in the color tone and density, thereby overcoming the above-described problems of the prior art.

To this end, according to the present invention, there is provided a liquid crystal display device having a pair of opposing substrates, conductive films provided on the substrates, and a liquid crystal filled between the opposing substrates, comprising a colored layer containing a polyazo compound and being provided on at least one of the substrates.

The above and other objects, features and advantages of the present invention will become clear from the following description of the preferred embodiments when the same is read in conjunction with the accompanying drawings.

DESCRIPTION OF THE PREFERRED EMBODIMENT

According to a preferred embodiment of the present invention, the polyazo dye for dyeing the colored layer is a dye which is expressed by the following general formula (A) and which has 2 to 8 sulfo groups per molecule.

(A)

where, $Q_1$ and $Q_2$ represent a benzene ring or naphthalene ring which may be substituted by an amino group, a hydroxyl group or a sulfo group, $R_1$ to $R_6$ independently represent one of a hydrogen atom, an amino group, a hydroxyl group and a sulfo group. The sulfo group takes the form of a sodium salt, or a ammonium salt which may be substituted by a group such as alkyl group having one to five carbon atoms by a group which is represented by The aforementioned object of the present invention can be achieved by forming, on the conductive film, a colored layer which has been dyed with a material which is represented by the general formula (A) shown above. That is, a liquid crystal display device, which is provided on the conductive film thereof with a colored layer with a dye represented by the general formula (A) above, enables the user to recognize the content of the display even when no voltage is applied, and prevents boundaries from being recognized even when viewed obliquely, while eliminating unfavorable effects such as change in color due to heat, fading of color due to exposure to light, unevenness of color and fluctuation in the thickness.

Examples of the base material for the colored layer are polyvinyl alcohol, gelatin, and water-soluble acrylate resins, as well as other water-soluble resins and resins soluble in alcohol such as methanol, ethanol, isopropyl alcohol and so forth, among which polyvinyl alcohol is the most preferable.

Examples of the dye represented by the general formula (A) suitable for use as dyes in the present invention are dyes Nos. 1 to 81 shown below.

No. 1

No. 2

No. 3

No. 4

No. 5

No. 6

No. 7

No. 8

No. 9

No. 10

No. 11

No. 12

No. 13

No. 14

No. 15

No. 16

No. 17

-continued

No. 18

No. 19

No. 20

No. 21

No. 22

No. 23

No. 24

No. 25

No. 26

No. 27

-continued

No. 28

No. 29

No. 30

No. 31

No. 32

No. 33

No. 34

No. 35

No. 36

-continued

No. 37

No. 38

No. 39

No. 40

No. 41

No. 42

No. 43

No. 44

No. 45

-continued

No. 46

No. 47

No. 48

No. 49

No. 50

No. 51

No. 52

No. 53

No. 54

-continued

No. 55

R = —CH₃
No. 56

R = —C₂H₃
No. 57

R = —CH₂CH₂CH
No. 58

R = —CH₃
No. 59

R = —CH₂—⌬
No. 60

R = —CH₃
No. 61

R = —(CH₂)₃CH₃
No. 62

-continued

No. 63

No. 64

No. 65

No. 66

No. 67

No. 68

No. 69

No. 70

-continued

No. 71

No. 72

No. 73

No. 74

No. 75

No. 76

No. 77

No. 78

No. 79

No. 80

No. 81

According to the present invention, the layer to be colored is dyed by dipping a substrate having been provided with a layer such as of polyvinyl alcohol into an aqueous solution or an alcohol solution containing 1 to 50 wt% of polyazo dye. If necessary, a mask of a predetermined pattern is laid on the layer to be colored, so that only a desired region or regions are dyed.

Preferably, the layer to be colored has a thickness which ranges between 500 Å and 5 μm and more preferably between 1000 Å and 1μ. The aforementioned colored layer, may be subjected to a uniaxial orientation treatment such as rubbing, after it is cured. It is also preferred that an orientation control film, which also serve as a protective layer, is formed on the colored layer. Such an orientation control film with uniaxial orientation treating axis can be obtained by forming a coating film of a resin such as polyvinyl alcohol, polyimide, polyesterimide, polyamideimide and polyamide, and effecting an orientation treatment such as rubbing on the thus formed resin coating film.

In the device of the invention, the colored layer may be formed either on the upper side of the conductive film or on the lower side of the same.

The liquid crystal used in the liquid crystal display device of the present invention may be a twisted nematic liquid crystal (TN liquid crystal), or a ferroelectric liquid crystal such as those disclosed in the specification of U.S. Pat. No. 4,367,924 and Japanese Patent Laid-Open Nos. 201021/1984, 21028/1985 and 31117/1985. The ferroelectric liquid crystal which is used suitably is chiral smectic liquid crystal, particularly in C phase (SmC*), H phase (SmH*), I phase (SmI*), J phase (SmJ*), K phase (SmK*), G phase (SmG*) and F phase (SmF*).

Ferroelectric liquid crystals are described in detail, for example, in the following literature "LE JOURNAL DE PHYSIQUE LETTERS" 36(L-69) 1975. (Ferroelectric liquid crystals); "Applied Physics Letters" 36(11) 1980 (Submicro Second Bistable Electrooptic Switching in Liquid Crystals); and "KOTAI BUTSURI (SOLID PHYSICS)" 16(141) 1981 (Liquid Crystals). Any of the ferroelectric liquid crystals disclosed in such literature can be used in the liquid crystal display device of the present invention.

Practical examples of the ferroelectric liquid crystals are decyloxybenzylidene-p'-amino-2-methylbutyl cinnamate (DOBAMBC), hexyloxybenzylidene-p'-amino-2-chloropropyl cinnamate (HOBACPC) and 4-O-(2-methyl)butylresolcylidene-4'-octylaniline (MBRA 8), as well as those disclosed in Japanese Patent Laid-Open Nos. 98051/1984, 118744/1984 and 128357/1984.

Figure 2:
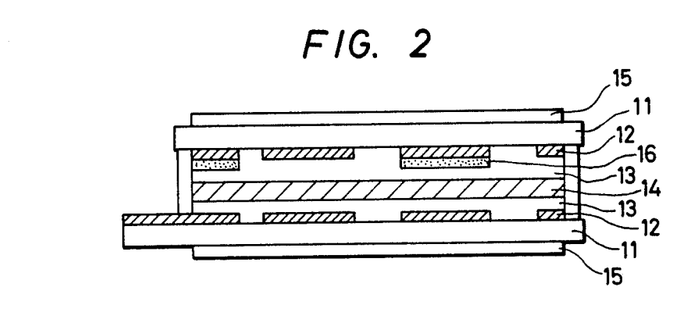
FIG. 2 is a schematic sectional view of a liquid crystal display device in accordance with the present invention.

FIG. 2 illustrates a schematic sectional view of a liquid crystal display of the present invention. In FIG. 2, the numeral 11 denotes transparent insulating substrates, 12 transparent electrode films, 13 orientation control films, 14 a liquid crystal, 15 polarizers, and 16 colored layers.

Examples of the liquid cell display device of the present invention will be described hereinunder.

EXAMPLE 1

(Preparation of Substrate for Dyeing)

A transparent conductive film made of indium oxide was formed on a glass substrate produced by Nippon Sheet Glass Co., Ltd. Meanwhile, a 3% aqueous solution of polyvinyl alcohol "Gosefimer Z-200" (produced by Nippon Synthetic Chemical Industry Co., Ltd.) was prepared and ammonium bichromate was added to the aqueous solution. The thus obtained solution was applied by means of a spinner to the surface of the electrode substrate to coat the latter. The electrode substrate was then irradiated by ultraviolet rays with a mask of a predetermined pattern placed thereon, and then the substrate was rinsed with water, so that a polyvinyl alcohol coating film having the desired pattern was formed.

(Dyeing of Electrode Substrate)

5% aqueous solutions were prepared with respective dyes represented by the aforementioned formulae. A surfactant "Liponox NA" (produced by The Lion Co., Ltd.) was added to each solution. The baths containing such solutions were provided: one was maintained at 60° C., while the other was maintained at room temperature. Electrode substrates having the polyvinyl alcohol layers, prepared in the method described above were dipped into these baths successively, and were rinsed sufficiently with water. The substrates were then immersed in a 30 g/l aqueous solution containing a fixing agent "Senkafix 300" (produced by Nippon Senka electrical power consumption which are unacceptable from a commercial point of view.

Kogyo K.K.) and left in this solution for 10 minutes. Then, the substrates were taken out of the aqueous solution and rinsed by water, followed by 30-minute drying at 80° C. Subsequently, a mixture solution of polyvinyl alcohol and organic titanate were applied to the substrates to coat the substrate surfaces. The coating layers were then thermally set by 1-hour heating at 200° C.

(Assemblage of Cell)

The surface of each electrode substrate having the colored layer and the orientation film were subjected to orientation treatment which was conducted by unidirectional rubbing. Two electrode substrates, one having the colored layer and one having no colored layer but provided with uniaxially rubbed polyvinyl alcohol film, were assembled together such that the directions of orientation are orthogonal mutually, and a liquid crystal was charged into the space between two electrode substrates, thus completing a liquid crystal cell. A plurality of such liquid crystal cells having colored layer dyed with respective dyes were prepared in this manner. These liquid crystal cells were subjected to the following tests for the purpose of evaluation of the performance.

1. Fading test by a fade meter (simulating lighting from the rear side): 100 hours
2. Electric current passage test at 70° C. and 85% humidity: 1000 hours In the fading test, the transmittance of the colored layer of each sample was measured before and after the test, whereas, in the operation test, the change in the electrical power consumption throughout the test period was measured.

The fading test showed that the rate of change in the transmittance did not exceed 10% in all cases, while the electric current passage test proved that the increase of the electrical power consumption does not exceed 20% of the initial value in all samples. These values are satisfactory, so that all the samples are satisfactorily usable as commercial products.

COMPARISON EXAMPLE

Comparison samples were prepared in the same manner as Example 1, using diazo and trisazo dyes having the following compositions. These comparison samples showed large rates of change in the transmittance and

EXAMPLE 2

Liquid crystal cells were prepared by using, in place of the dyes used in Example 1, the dyes Nos. 2, 4, 5, 7, 8, 10, 12, 14, 18, 20, 24, 28, 32, 37, 42, 43, 45, 47, 50, 53, 57, 58, 60, 62, 63, 65, 70, 73 and 80, in the same process as Example 1. These cells were sujected to the same tests as Example 1 for the purpose of evaluation of the performance. All the samples of this example showed color fading rate of not greater than 10%, and no abnormality was observed in the electric current passage test conducted under the supply of electrical power.

EXAMPLE 3

Substrates with and without the colored layers, used in Example 1, were assembled such that the directions of rubbing treatment are parallel to each other and such that a gap of 1.5 μm was left therebetween. A ferroelectric liquid crystal of DOBAMBC was heated until it showed an isotropy, and then it was filled into the cell, the cell was gradually cooled such that the liquid crystal has a chiral smectic C phase. An observation through a deflection microscope showed that the spiral structure of the smectic C phase had been extinguished. The cells thus formed were subjected to the same tests as Example 1 for the purpose of evaluation of the performance. The sample of this example showed color fading rate of not greater than 10%, and no abnormality was observed in the operation test conducted under the supply of electrical power.

As understood from the foregoing description, according to the invention, the content of the display can be recognized by the user beforehand even when the light is being passed in an ordinary manner, by virtue of the fact that the colored layer is provided on the transparent electrode. In addition, since the colored layer is provided as a thin film in the liquid crystal display device, the boundary of the colored layer is not observed even when the device is viewed obliquely. At the same time, the colored layer exhibits high resistance to heat and light, particularly when it has been dyed with tetrazo dye, so that a high quality of display suffering from no substantial uneveness in color and density can be maintained for a long time.

We claim:

1. A liquid crystal display device having a pair of opposing substrates, conductive films provided on said substrates, and a liquid crystal filled between the opposing substrates, comprising a colored layer containing a polyazo compound and being provided on at least one of said substrates.

2. A liquid crystal display device according to claim 1, wherein said polyazo compound is a tetrazo compound.

3. A liquid crystal display device according to claim 2, wherein said tetrazo compound has at least 2 to 8 sulfo groups in its molecule.

4. A liquid crystal display device according to claim 2, wherein said polyazo compound is a dye which is represented by the following general formula (A) and which has 2 to 8 sulfo groups per molecule, where, $Q_1$ and $Q_2$ represent a benzene ring or naphthalene ring which may be substituted by an amino group, a hydroxyl group or a sulfo group, $R_1$ to $R_6$ independently represent one of a hydrogen atom, an amino group, a hydroxyl group and a sulfo group, and the sulfo group may take the form of sodium salt, or a quaternary ammonium salt.

5. A liquid crystal display device according to claim 1, wherein said colored layer comprises polyvinyl alcohol.

6. A liquid crystal display device according to claim 1, wherein said colored layer comprises gelatin.

7. A liquid crystal display device according to claim 1, wherein said colored layer comprises an acrylic acid resin.

8. A liquid crystal display device according to claim 1, wherein the content of said polyazo compound in said colored layer ranges between 1 and 50% by weight.

9. A liquid crystal display device according to claim 1, further comprising an orientation control film formed on said colored layer.

10. A liquid crystal display device according to claim 9, wherein said orientation control film was a uniaxial orientation treatment axis.

11. A liquid crystal display device according to claim 10, wherein said uniaxial orientation treatment axis is rubbing treatment axis.

12. A liquid crystal display device according to claim 9, wherein said orientation control film is formed of at least one resin selected from the group consisting of polyvinyl alcohol, polyimide, polyesterimide, polyamideimide and polyamide.

13. A liquid crystal display device according to claim 9, wherein said orientation control film is formed of a polyvinyl alcohol which has been cured in the presence of an organic titanate compound.

14. A liquid crystal display device according to claim 1, wherein said liquid crystal is a twisted nematic liquid crystal.

15. A liquid crystal display device according to claim 1, wherein said liquid crystal is a ferroelectric liquid crystal.

16. A liquid crystal display device according to claim 15, wherein said ferroelectric liquid crystal is a chiral smectic liquid crystal.

17. A liquid crystal display device according to claim 16, wherein said chiral smectic liquid crystal has a thickness which is small enough to extinguish the spiral structure of the chiral smectic liquid crystal.

18. A liquid crystal display device according to claim 1, wherein said colored layer has sensitivity to light at the time of formation of said film.

19. A liquid crystal display device according to claim 1, wherein said colored layer is provided between said substrate and said conductive film.

20. A liquid crystal display device according to claim 1, wherein said colored layer is provided on the outer surface of said conductive film.

* * * * *

UNITED STATES PATENT AND TRADEMARK OFFICE
CERTIFICATE OF CORRECTION

PATENT NO. : 4,729,637                Page 1 of 3
DATED : March 8, 1988
INVENTOR(S) : YASUFUMI SATO, ET AL.

It is certified that error appears in the above-identified patent and that said Letters Patent is hereby corrected as shown below:

<u>AT [57] IN THE ABSTRACT</u>

Line 5, "and" should be deleted.

<u>COLUMN 1</u>

Line 50, "Since the" should read --The--.

<u>COLUMN 2</u>

Line 65, "a" (second occurrence) should read --an--.

<u>COLUMN 7</u>

Form 26, "$N_3O_3S-$" should read --$NaO_3S-$---.

<u>COLUMN 9</u>

Form 28, "$N_3O_3S-$" should read --$NaO_3S-$---.

UNITED STATES PATENT AND TRADEMARK OFFICE
CERTIFICATE OF CORRECTION

PATENT NO. : 4,729,637
DATED : March 8, 1988
INVENTOR(S) : YASUFUMI SATO, ET AL.

It is certified that error appears in the above-identified patent and that said Letters Patent is hereby corrected as shown below:

COLUMN 15

Form 59, "$RH_3HO_3S-$" should read --$RH_3NO_3S$---.
Form 62, "  "

should read --  --

COLUMN 19

Form 71, "$RH_3HO_3S-$" should read --$RH_3NO_3S$---.

COLUMN 21

Line 37, "serve" should read --serves--.
Line 62, "(Submicro Second" should read --(Submicrosecond--.

COLUMN 22

Line 28, "methyl)butylresolcylidene" should read --methyl)-butylresorcylidene--.

UNITED STATES PATENT AND TRADEMARK OFFICE
CERTIFICATE OF CORRECTION

PATENT NO. : 4,729,637

DATED : March 8, 1988

INVENTOR(S) : YASUFUMI SATO, ET AL.

It is certified that error appears in the above-identified patent and that said Letters Patent is hereby corrected as shown below:

COLUMN 24

Line 27, "sujected" should read --subjected--.
    Line 40, "an isotropy," should read --anistropy,--.
    Line 63, "uneveness" should read --unevenness--.

COLUMN 26

Line 5, "was" should read --has--.

Signed and Sealed this

Nineteenth Day of July, 1988

Attest:

DONALD J. QUIGG

*Attesting Officer*      *Commissioner of Patents and Trademarks*